United States Patent [19]
Aitken et al.

[11] 3,857,290
[45] Dec. 31, 1974

[54] SOLDERABILITY TESTING

[75] Inventors: John Stuart Aitken, Windyshields; Bernard Leslie Green, Cleghorn; William Alexander Cormie, Strathaven, all of England

[73] Assignee: Honeywell Information Systems Limited, Brentford, Middlesex, England

[22] Filed: Nov. 30, 1973

[21] Appl. No.: 420,476

[30] Foreign Application Priority Data
Dec. 2, 1972  Great Britain .................... 55755/72

[52] U.S. Cl. ...................... 73/432 R, 29/593, 73/55
[51] Int. Cl. .......................................... G01n 13/00
[58] Field of Search ...... 29/503, 593; 73/61.2, 64.4, 73/432 R, 17 R, 55, 58; 324/73 PC, 182

[56] References Cited
UNITED STATES PATENTS

| | | | |
|---|---|---|---|
| 3,192,474 | 6/1965 | Cherry | 29/593 UX |
| 3,470,612 | 10/1969 | Helms | 29/593 |
| 3,787,768 | 1/1974 | Kubota et al. | 323/73 PC X |

Primary Examiner—Richard C. Queisser
Assistant Examiner—Frederick Shoon
Attorney, Agent, or Firm—Ronald T. Reiling

[57] ABSTRACT

The solderability of plated through holes in a printed circuit board is treated by applying solder to one end of the hole and measuring the time it takes to travel through the hole. This time is a measure of solderability — the shorter the time, the better the solderability. Apparatus for carrying out the method comprises a work platform 11 for holding the board 20; a probe 22 for centering a hole in the board and then forming a contact at the end of the hole, level with the upper surface of the board; a solder supply system 15 for applying solder to the bottom end of the hole; and a timer 40 for electrically measuring the time taken for solder to pass through the hole.

4 Claims, 1 Drawing Figure

PATENTED DEC 31 1974
3,857,290
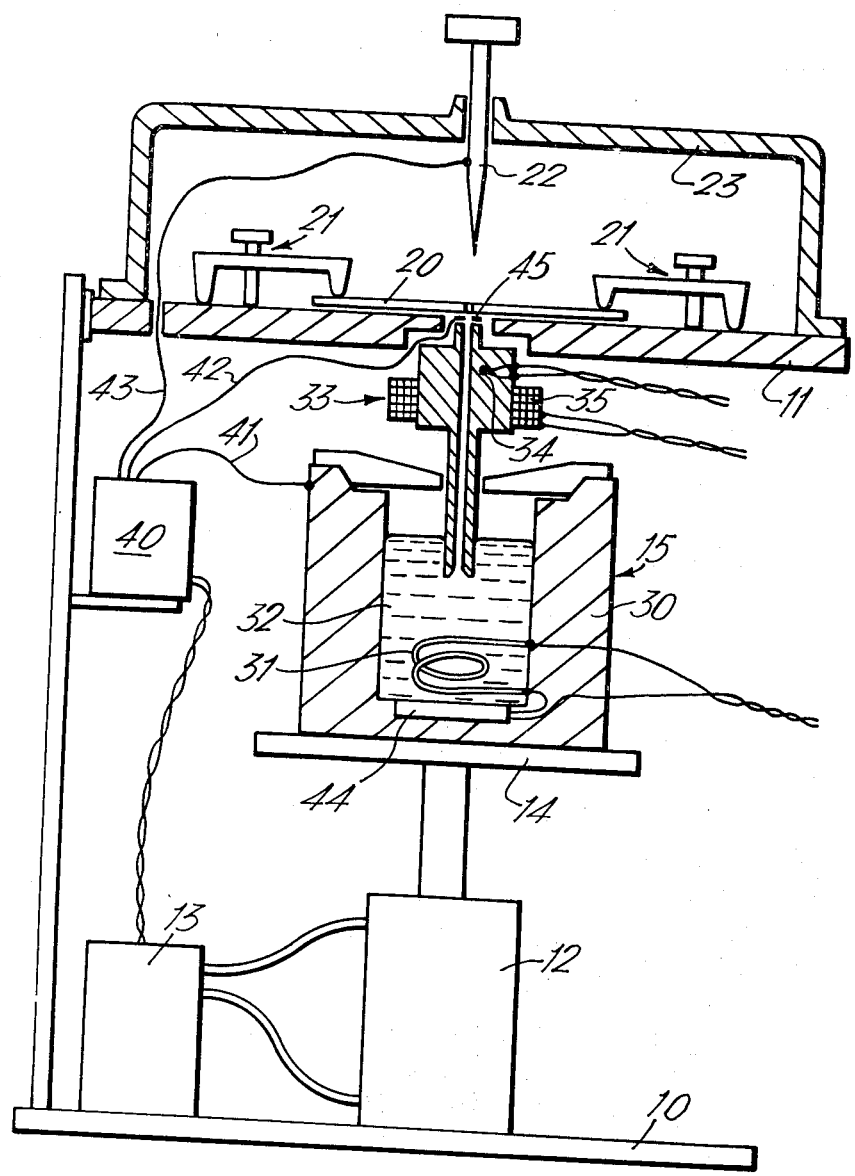

SOLDERABILITY TESTING

BACKGROUND OF THE INVENTION

The present invention relates to the testing of solderability, and more specifically to the testing of the solderability of through plated holes in printed circuit boards.

A variety of methods have been proposed for testing solderability of metallized surfaces. Some of these involve a visual inspection of a metallized area, and are therefore directly applicable only to large flat areas. The use of such method for testing through plated holes is therefore indirect; the board with the holes also has a flat test area provided on it, and it is assumed that the solderability of the holes is the same as that of the test area. This method therefore rests on the assumption that the large flat test area and the through holes, of small bore and small total area, are produced with the same characteristics during manufacture — an assumption which is not always justified. It also results in a waste of parts of the board to provide the test area.

A method of testing through holes directly has been proposed, consisting of soldering through the hole and then taking a section through the hole and visually examining it. This is destructive and time-consuming.

There is therefore a need for a direct method of testing the solderability of through-tested holes in printed circuit boards, which is rapid and preferably non-destructive.

SUMMARY OF THE INVENTION

Accordingly the invention provides a method of testing the solderability of a through plated hole in a printed circuit board, comprising applying solder to one end of the hole and measuring the time taken for the solder to travel through the hole to the other end. This method is simple and direct, and it has been found that the time is a good measure of the solderability of the hole. It is also easy to force the solder out of the hole after testing; e.g., pneumatically, so that the method becomes non-destructive. The invention also provides apparatus for carrying out this method.

DETAILED DESCRIPTION OF THE DRAWING AND PREFERRED EMBODIMENT

An embodiment of the invention will now be described by way of example, with reference to the accompaning drawing, which is a diagrammatic and part sectional view of a solderability tested.

Referring to the drawing, the tester has two horizontal platforms, a base 10 and a work platform 11 above the base. An actuator 12 is mounted on the base 10, and controlled from a controller 13. The actuator may be hydraulic, enabling fine control speeds to be used together with substantially instantaneous starting and stopping and with no creep or other motion while stopped. The actuator 12 drives a plate 14 on which a solder supply system 15 is mounted.

The work platform 11 carries the printed circuit board 20 under test. A pointed stainless steel probe 22 is mounted in a spider support 23 for vertical movement, and can be moved down so that its tip enters the hole to be tested and centers the board 20 properly in position. Clamps 21 permit the board to be clamped into position.

The solder supply system 15 comprises a solder pot 30 with a heater 31 and thermostat 44, and containing solder 32. A stainless steel piston 33, which is secured to the work platform 11, has a central bore and also has a temperature sensor 34 mounted near its upper end and a heater coil 35. The upper end or tip of the piston 33 has an aperture of suitable diameter for contacting a single hole in the printed circuit board 20 without affecting adjacent holes.

A control and timing circuit 40 has electrical connections 41, 42, and 43 to the solder supply system 15, a ring 45 at the top of the piston 33, and the probe 22 respectively.

In operation, the solder 32 is kept hot at approximately the desired temperature by the heater 31 and thermostat 44, which exerts a coarse temperature control, and the sensor 34 controls the piston heater 35 to give fine temperature control of the solder at the piston tip. The printed circuit board 20 is positioned, as described above, by using the probe 22 so that the hole to be tested is aligned with the tip of the piston 33. The probe is then withdrawn until its point is level with the upper surface of the board 20. This may be achieved by various means. For example, the probe may have a small spider mounted on it which normally holds the probe tip level with the spider feet, the spider being spring-mounted on the probe so that the probe can be pushed down through the spider for centering the probe in the hole in the board.

The tester is now ready for making the test. To make the test, the actuator 12 is operated to raise the solder supply 15 slowly forcing solder 32 through the central bore in the piston 33 until the solder contacts the board 20; this is detected by the completion of contact between lines 41 and 42.

The actuator 12 is immediately halted, so that the solder at the tip of the cylinder 33 is in contact with the bottom end of the hole under test, and a timer in unit 40 is started. The solder will rise up the hole under test at a rate dependent on the solderability of the hole, and eventually reach the top of the hole, where it will touch the tip of the probe 22. This will complete a circuit between leads 41 and 43, and the timer is stopped. The time recorded by the timer is then a measure of the solderability of the hole; the shorter this time is, the better is the solderability. Since the probe is stainless steel, it will not be wetted by the solder.

Preferably, the solder supply system is automatically lowered away from the board as soon as the solder has contacted the probe 22. Also, a maximum time feature may be included, the solder supply system being lowered after this maximum time whether or not the solder has reached the probe 22, and an "unsolderable" indication being given if the solder has not reached probe 22.

Pneumatic means may be provided for blowing the solder out of the hole after the test has been completed.

The solder supply system may be modified to consist of a closed pot kept full of solder, so that the chamber 30 and the piston 33 are no longer distinct, and providing a piston at the bottom of the chamber 30. As before, contact between the tip of the "piston" 33 and the board will first be made, and then the solder will be forced up to and through the tip of this "piston".

If the design of the board is appropriate, the ring 45 may be omitted and a connection made instead to a conductor on the board connected to the hole therein.

Accordingly, having described the invention, what is claimed as new and novel and for which it is desired to secure Letters Patent is:

1. A method of testing the solderability of a through plated hole in a printed circuit board comprising applying solder to one end of the hole and measuring the time taken for the solder to travel through the hole to the other end.

2. A method according to claim 1, wherein the solder is forced out of the hole after the time for it to travel through the hole has been measured.

3. Apparatus for carrying out the method according to claim 1 comprising:

a work platform for holding the printed circuit board, a probe for placement with its tip in the axis of the hole and level with the upper surface of the board, a solder supply system mounted below the platform having a solder tip at its top and raisable to bring the solder tip into contact with the board, and an electric timer with connections to the solder supply system, a contact adjacent to the lower end of the hole, and the probe.

4. Apparatus according to claim 3 wherein the timer signals an unsolderable hole if the time taken for the solder to rise through the hole exceeds a predetermined period.

* * * * *